US008597026B2

(12) United States Patent
Cincotti et al.

(10) Patent No.: US 8,597,026 B2
(45) Date of Patent: Dec. 3, 2013

(54) IMMERSIVE TRAINING SCENARIO SYSTEMS AND RELATED METHODS

(75) Inventors: K. Dominic Cincotti, Fayetteville, NC (US); Trevor J. Kracker, Lumberton, NC (US)

(73) Assignee: Military Wraps, Inc., Lumberton, NC (US)

( * ) Notice: Subject to any disclaimer, the term of this patent is extended or adjusted under 35 U.S.C. 154(b) by 1201 days.

(21) Appl. No.: 12/229,047

(22) Filed: Aug. 19, 2008

(65) Prior Publication Data

US 2012/0135381 A1    May 31, 2012

Related U.S. Application Data

(60) Provisional application No. 61/123,826, filed on Apr. 11, 2008.

(51) Int. Cl.
*F41G 3/26*    (2006.01)

(52) U.S. Cl.
USPC .................................. 434/22; 434/72; 434/79

(58) Field of Classification Search
USPC ........................................................ 434/19–24
See application file for complete search history.

(56) References Cited

U.S. PATENT DOCUMENTS

| | | | | |
|---|---|---|---|---|
| 3,802,098 A | * | 4/1974 | Sampson et al. | 434/20 |
| 4,001,949 A | * | 1/1977 | Francis | 434/226 |
| 4,234,911 A | * | 11/1980 | Faith | 362/111 |
| 4,526,548 A | * | 7/1985 | Livingston | 434/226 |
| 5,203,707 A | * | 4/1993 | Musto et al. | 434/226 |
| 5,219,316 A | | 6/1993 | Huffman | |
| 5,226,818 A | * | 7/1993 | Feiock et al. | 434/226 |
| 5,242,172 A | | 9/1993 | Bateman | |
| 5,320,358 A | * | 6/1994 | Jones | 273/371 |
| 5,496,176 A | * | 3/1996 | Swanson | 434/154 |
| 5,599,187 A | * | 2/1997 | Mesiano | 434/19 |
| 5,822,936 A | | 10/1998 | Bateman | |
| 5,904,410 A | * | 5/1999 | Davies | 312/259 |
| 5,951,016 A | | 9/1999 | Bateman | |
| 6,179,620 B1 | * | 1/2001 | Schmid | 434/226 |
| 6,257,583 B1 | * | 7/2001 | Roberson | 273/390 |
| 6,354,212 B1 | * | 3/2002 | Krinsky | 101/483 |
| 6,497,442 B1 | * | 12/2002 | Wacker | 296/24.32 |
| 6,579,097 B1 | | 6/2003 | Sampson et al. | |
| 6,631,683 B2 | * | 10/2003 | Krinsky | 101/483 |
| 6,959,646 B2 | * | 11/2005 | Fujii et al. | 101/484 |

(Continued)

FOREIGN PATENT DOCUMENTS

WO    WO 2009/126173    10/2009
WO    WO 2011/069112    6/2011

OTHER PUBLICATIONS

Action Target, Inc. website, www.actiontarget.com, Mar.-Apr. 2012.

(Continued)

*Primary Examiner* — Robert J Utama
(74) *Attorney, Agent, or Firm* — J. Bennett Mullinax, LLC

(57) ABSTRACT

Immersive training scenario systems and related methods are provided. The immersive training scenario systems can provide at least one simulated structure. The at least one simulated structure can include a base structure having at least one surface thereon. One or more substrates with one or more photographic images printed thereon are applied to the surface of the base structure so that the simulated structure has realistic visual characteristics representative of a mission site or mission scenario.

16 Claims, 11 Drawing Sheets

(56) References Cited

U.S. PATENT DOCUMENTS

| | | | |
|---|---|---|---|
| 7,329,127 B2* | 2/2008 | Kendir et al. | 434/21 |
| 7,922,492 B2* | 4/2011 | Nielsen et al. | 434/80 |
| 8,123,526 B2* | 2/2012 | Hoover et al. | 434/21 |
| 2002/0069078 A1* | 6/2002 | Goldstein | 705/1 |
| 2003/0027103 A1* | 2/2003 | Preston et al. | 434/11 |
| 2003/0227440 A1* | 12/2003 | Fager et al. | 345/156 |
| 2004/0196282 A1* | 10/2004 | Oh | 345/419 |
| 2005/0005339 A1* | 1/2005 | Johnson | 2/69 |
| 2005/0071040 A1* | 3/2005 | Kirila | 700/130 |
| 2005/0079330 A1 | 4/2005 | Tanel | |
| 2005/0100717 A1 | 5/2005 | Riddle | |
| 2005/0128212 A1* | 6/2005 | Edecker et al. | 345/582 |
| 2005/0158101 A1* | 7/2005 | Silverbrook et al. | 400/62 |
| 2005/0200682 A1* | 9/2005 | Silverbrook et al. | 347/104 |
| 2005/0272011 A1 | 12/2005 | Herman et al. | |
| 2006/0107985 A1 | 5/2006 | Sovine | |
| 2006/0271860 A1* | 11/2006 | Walter | 715/738 |
| 2007/0020585 A1* | 1/2007 | Bjorkman et al. | 434/11 |
| 2007/0113487 A1* | 5/2007 | Warminsky | 52/79.1 |
| 2007/0117503 A1* | 5/2007 | Warminsky | 454/187 |
| 2007/0118805 A1 | 5/2007 | Kraus et al. | |
| 2009/0111073 A1* | 4/2009 | Stanley | 434/21 |
| 2009/0237564 A1 | 9/2009 | Kikinis et al. | |
| 2009/0286208 A1* | 11/2009 | Coleman | 434/20 |
| 2010/0013162 A1* | 1/2010 | Wright et al. | 273/406 |
| 2010/0064596 A1* | 3/2010 | Bowsher | 52/29 |
| 2010/0225064 A1* | 9/2010 | Deatherage, Jr. | 273/405 |
| 2010/0275797 A1* | 11/2010 | Cortina et al. | 101/484 |
| 2011/0035708 A1* | 2/2011 | Damale | 715/863 |
| 2011/0171623 A1* | 7/2011 | Cincotti et al. | 434/365 |
| 2011/0256511 A1* | 10/2011 | Cragg | 434/11 |
| 2011/0300514 A1* | 12/2011 | Didier et al. | 434/11 |

OTHER PUBLICATIONS

Action Target, Inc. website, www.actiontarget.com, Jun. 29, 2010.
I/ITSEC Interservice/Industry Training, Simulation & Education Conference Program Guide, Nov. 30-Dec. 3, 2009, Part 1.
I/ITSEC Interservice/Industry Training, Simulation & Education Conference Program Guide, Nov. 30-Dec. 3, 2009, Part 2.
I/ITSEC Interservice/Industry Training, Simulation & Education Conference Program Guide, Nov. 30-Dec. 3, 2009, Part 3.
I/ITSEC Interservice/Industry Training, Simulation & Education Conference Program Guide, Nov. 30-Dec. 3, 2009, Part 4.
Action Target Brochure, MATCH—Modular Armored Tactical Combat House, at least as early as Jun. 2010.
Meggitt Training Systems Canada Brochure, Unmanned Target Drone System: Aerial Radar Sea Skimming Target Drone, at least as early as Mar. 2012.
Meggitt Training Systems Canada Brochure, Unmanned Target Drone System: Aerial Radar Target Drone DT35, at least as early as Mar. 2012.
Meggitt Training Systems Canada Brochure, Unmanned Target Drone System: Aerial Air-Launched Target Drone, at least as early as Mar. 2012.
Meggitt Training Systems Canada Brochure, POP-UP Helicopter Target: Threat Simulation/Unmanned Operations, at least as early as Mar. 2012.
Action Target Brochure, Control Systems: Target Control Module, at least as early as Jun. 2010.
Meggitt Training Systems Canada Brochure, Scanning Projectile Impact Evaluation System (SPIES), at least as early as Mar. 2012.
Lamothe, Dan, "Training Gets 'Hyper-Realistic'," *Marine Corps Times*, Nov. 2, 2009.
Urban Warfare, webpage, Wikipedia, free encyclopedia, www.en.wikipedia.org/wiki/Urban_warfare, Jun. 29, 2010.
Meggitt Training Systems Canada Brochure, Universal Target Control Station: Multiple Target Command & Control, at least as early as Mar. 2012.
Ad Graphics, Inc. Advertisement, Sign Business Magazine, Nov. 1993.
Photograph of a building in Northern Virginia with graphic artwork applied thereto. This artwork has allegedly been on the building since at least as early as 1993.
Homepage for Ad Graphics website, www.adgraphics.us, Dec. 22, 2008.
Contact and FAQs webpages from Sign Farm website, www.signfarm.com, Dec. 16, 2008.
KB Port Simulation Environments [online]. Jan. 25, 2008 [retrieved on Jan. 28, 2009]. www.kbport.com/products/pse-main.php?KeepThis=true&TB_iframe=true&width=805>; pp. 1-2; Figs. 1-2.
Berlin Wallpaper—Animals of the Wild [online]. Jan. 19, 2008 [retrieved on Feb. 3, 2009]. www.berlinwallpaper.com/wallsofthewild/Default.asp>; p. 1.
Moyle, Wendy. Personalized Standees and Wall Graphics for Mother's Day [online]. Apr. 10, 2008 [retrieved on Feb. 3, 2009]. http://shindigzparty.wordpress.com/2008/04/10/personalized-standees-and-wall-graphics-for-mothers-day/>; p. 1.
International Search Report for PCT/US08/73590 dated Feb. 18, 2009.
"How to Disappear," The Economist Technology Quarterly, Sep. 6, 2008, pp. 21 and 24.
[Request] (MOUT) Shoothouse Statics—Project Reality Forums, Forum thread, Project Reality website, realitymod.com/forum/f388-pr-bf2-community-modding/56936-request-mout-shoothouse-statics.html, posted Apr. 1, 2009 [retrieved on Mar. 8, 2012].
Witte, Tom, A Survey of 3-D Urban Mapping Visualization Capabilities, conference paper,The International Society for Photogrammetry and Remote Sensing Joint Symposia URBAN—URS 2005, Mar. 14-16, 2005, Tempe, Az, USA, vol. XXXVI-8/W27, 2005.
Urban Warfare, webpage, Wikipedia, free encyclopedia, www.en.wikipedia.org/wiki/Urban_warfare, Mar. 30, 2012.
Urban Warfare, webpage, Wikipedia, free encyclopedia, www.en.wikipedia.org/w/index.php?title=Urban_warfare&oldid=370319040, at least as early as Jun. 26, 2010 [retrieved on Apr. 12, 2012].
Urban Warfare, webpage, Wikipedia, free encyclopedia, www.en.wikipedia.org/w/index.php?title=Urban_warfare&oldid=229300924, at least as early as Aug. 1, 2008 [retrieved on Apr. 12, 2012].
Sejnowski, Terry, asktheBrains column, Response to: "Is It True That When We Drive, Walk, or Reach, for Something Our Brain Performs Calculations? Is This Ability Learned or Innate?," Scientific American Mind, published by Scientific America, Inc., Nov./Dec. 2009.
Schuett, Aaron, "Taking Technology to New Heights," webpage article, Moldmaking Technology website, www.moldmakingtechnolgy.com/articles/taking-technology-to-new-heights, posted Nov. 1, 2006 [retrieved on Mar. 30, 2012].
RAND Corporation, "Preparing for the Proven Inevitable: An Urban Operations Training Strategy for America's Joing Force," 2006, Part 4.
RAND Corporation, "Preparing for the Proven Inevitable: An Urban Operations Training Strategy for America's Joing Force," 2006, Part 3.
RAND Corporation, "Preparing for the Proven Inevitable: An Urban Operations Training Strategy for America's Joing Force," 2006, Part 2.
RAND Corporation, "Preparing for the Proven Inevitable: An Urban Operations Training Strategy for America's Joing Force," 2006, Part 1.
Navy Press Release No. 597-08, Jul. 15, 2008.
Meggitt Training Systems website, www.meggitttrainingsystems.com, Mar.-Apr. 2012, Part 2.
Meggitt Training Systems website, www.meggitttrainingsystems.com, Mar.-Apr. 2012, Part 1.
Meggitt Training Systems Canada website, www.meggittcanada.com, Mar.-Apr. 2012.
Meggitt Training Systems Canada Brochure, Vindicator II: Realistic, Cost-Effective Threat Simulation, at least as early as Mar. 2012.
Meggitt Training Systems Canada Brochure, Unmanned Target Drone System: Aerial Radar Target Drone DT25 R, at least as early as Mar. 2012.

(56) References Cited

OTHER PUBLICATIONS

Meggitt Training Systems Canada Brochure, TRX-9 Radar Augmented Towed Target With Microdops Scoring, at least as early as Mar. 2012.
Meggitt Training Systems Canada Brochure, TLX-1 Low Level Height-Keeping Tow Target, at least as early as Mar. 2012.
Meggitt Training Systems Canada Brochure, TDK-39A Aerial Gunnery Tow Target, at least as early as Mar. 2012.
Meggitt Training Systems Canada Brochure, Mosquito Unmanned Helicopter Vehicle—Target (UHV-T): Cost-Effective, Subscale Helicopter Threat Simulation, at least as early as Mar. 2012.
Meggitt Training Systems Canada Brochure, High Speed Inflatable Towed Target (HSITT): Maritime Threat Simulation, at least as early as Mar. 2012.
Meggitt Training Systems Canada Brochure, Hammerhead: Maritime Threat Simulation, at least as early as Mar. 2012.
Meggitt Training Systems Canada Brochure, Barracuda: Maritime Threat Simulation/Unmanned Operations, at least as early as Mar. 2012.
Meggitt Training Systems Canada Brochure, Badger: A Flexible and Realistic Tank Target, at least as early as Mar. 2012.
Meggitt Training Systems Brochures, Stationary Armor Target, Moving Armor Target System, & Moving Armor Target, at least as early as Mar. 2012.
Meggitt Training Systems Brochure, Stationary Infantry Target System, at least as early as Mar. 2012.
Meggitt Training Systems Brochure, RangeMaster Control System, at least as early as Mar. 2012.
Meggitt Training Systems Brochure, Multi-Function Stationary Infantry Target System (MF-SIT), at least as early as Mar.2012.
Meggitt Training Systems Brochure, Meggitt SHOTT house (Shoot House for Optimized Tactical Training), at least as early as Mar. 2012.
Meggitt Training Systems Brochure, Entry Control Point Moving Target (ECPMT), at least as early as Mar. 2012.
Meggitt Defense Systems Brochure, Model RM-30A1 Reeling Machine-Launcher, at least as early as Mar. 2012.
Meggitt Defense Systems Brochure, GT-400 Glide Target, at least as early as Mar. 2012.
McKee, et al., "Future Combat Vehicle Protected by an Active Camouflage System," Military Technology (Miltech), Jul. 17, 2009.
McCarty, Brad, "Google Adding Store Interiors to Street View," web magazine article, The Next Web, thenextweb.com/google2010/04/22/google-adding-store-interiors-street-view/, Apr. 22, 2010 [retrieved on Apr. 12, 2012].
International Search Report and Written Opinion for PCT/US 10/58969 dated Mar. 10, 2011.
I/ITSEC Newsletter, Published by NTSA, vol. 8, No. 4, Nov. 2009.
Hardwick, et al.,"A New Look at the Infantry Company," Infantry Magazine, Nov.-Dec. 2004.
Grossman, Lt. Col. Dave, Evolution of Weaponry, www.killology.com/Weaponry.htm, at least as early as 2006 [retrieved on Apr. 12, 2012].
Greenemeier, Larry: "Sticky Savior: U.S. Army Readies a New Blast-Protection Adhesive for Deployment," http://www.scientificamerican.com/article.cfm?id=army-polymer-adhesive, Dec. 18, 2008.
Geospatial Intelligence,webpage, Wikipedia, free encyclopedia, www.en.wikipedia.org/w/index.php?title=Geospatial_intelligence&oldid=230659229, at least as early as Aug. 8, 2008 [retrieved on Apr. 12, 2012].
Geospatial Intelligence, webpage, Wikipedia, free encyclopedia, www.en.wikipedia.org/wiki/Geospatial_intelligence, Jun. 29, 2010.
Geospatial Intelligence, webpage, Wikipedia, free encyclopedia, www.en.wikipedia.org/wiki/Geospatial_intelligence, Apr. 12, 2012.
Geospatial Intelligence, webpage, Wikipedia, free encyclopedia, www.en.wikipedia.org/w/index.php?title=Geospatial_intelligence&oldid=370566203, at least as early as Jun. 28, 2010 [retrieved on Apr. 12, 2012].
Gassler, John Jr.: "Military Wraps: The Next Generation in Combat Training Solutions," Special Operations Report, vol. 16, Sep. 15, 2008.
Florida, R., "Small Science with Big Promise—Nanotechnology Research at NJIT," NJIT Magazine, pp. 14-17, at least as early as Sep. 10, 2008.
Eltron, "Advanced Nano-Phase Materials Promise to Revolutionize Solid State Power Generation, Peltier Heating/Cooling," Eltron Research and Development Tech Brief, 2009.
Coxworth, Ben, "Laser Backpack Created for 3D Mapping," webpage article from web magazine, GIZMAG, www.gizmag.com/3d-mapping-laser-backpack/16338/, Sep. 10, 2010 [retrieved on Apr. 12, 2012].
Cote, Paul, GIS Manual: Spatial Information in Design Culture, webpage, www.gsd.harvard.edu/gis/manual/projection_fundamentals/, at least as early as 2010 [retrieved on Mar. 30, 2012].
Cote, Paul, GIS Manual: Georeferencing Images and CAD Data, webpage, www.gsd.harvard.edu/gis/manual/georeferencing/index.htm, at least as early as 2010 [retrieved on Mar. 30, 2012].
Cote, Paul, GIS Manual: Exchanging Data between GIS and CAD Formats, web age, www.gsd.harvard.edu/gis/manual/cad/index.htm#overview, at least as early as 2010 [retrieved on Mar. 30, 2012].
Chwang, Anna B., "Thin Film Encapsulated Flexible Organic Electroluminescent Displays," Appl. Phys. Lett., vol. 83, 413, Jul. 21, 2003.
Boessenkool, A., "Lockheed Martin Looks to Nanotechnology," Lockheed Martin, Sep. 12, 2008.
NTC Acquisition Command—Request for Proposals,Solicitation No. W9124B-08-R-0027, dated Jul. 28, 2008.

\* cited by examiner

SAFETY FURNISHINGS - CARDBOARD COFFEE TABLE

SAFETY FURNISHINGS - HOLLOW FAUX WASHER DRYER

SAFETY FURNISHINGS - HOLLOW FAUX STEREO

IMMERSIVE TRAINING SCENARIO SYSTEMS AND RELATED METHODS

RELATED APPLICATIONS

The presently disclosed subject matter claims the benefit of U.S. Provisional Patent Application Ser. No. 61/123,826, filed Apr. 11, 2008; the disclosure of which is incorporated herein by reference in its entirety.

TECHNICAL FIELD

Generally, firearms or tactical training systems and related methods are provided. More particularly, methods and systems for an immersive firearms or tactics training scenario that can be mobile, static, or re-configurable are provided that present simulated structures that accurately re-create realistic visual characteristics of the structure by utilizing site-specific photographic images and large-format printing and the application of same.

BACKGROUND

As more of the world's population moves into an urban environment, battles that are fought in urban areas will also increase. Therefore, soldiers must train for the possibility of having to enter buildings, positively distinguish between friend or foe, and act accordingly. Such training is also needed for law enforcement as well as private security companies. The current shift in doctrine toward more and better urban training for U.S. military, law enforcement and private security personnel is a direct result of the increase in number of armed conflicts and perceived threats in urban environments.

Urban combat is very different from combat in the open at both the operational and tactical level. Complicating factors in urban warfare are the presence of civilians and buildings of all sorts. Some civilians may be difficult to distinguish from combatants such as armed militias and gangs, particularly if individuals are trying to protect their homes. Tactics are complicated by a three-dimensional environment, limited field of view and field of fire because of buildings, enhanced concealment and cover for defenders, below ground infrastructure, and the ease of placement of booby traps and snipers.

Detailed planning is essential. Ideally, the leader of a assault team gathers all available intelligence about the crisis scene, targets, and innocents. The leader diagrams and discusses the proposed plan, outlining each of the team's actions and responsibilities, location, fields of fire, and special tasks (even to the point of a wall-by-wall and door-by-door layout of the objective, where available). Since the assault team usually already has specialized training, the operation is based on well-understood, pre-established standing operating procedure. When considerable preparation time is available, the team sometimes conducts step-by-step walk-through exercises on a mock-up that attempts to duplicate the target environment. Some units maintain permanent "shoot houses" or even airliner/ship mock-ups for providing more realistic practice for marksmanship and tactics.

One of the most dramatic examples of the value and power of this modern, psychological revolution in training can be seen in observations of the 1982 Falklands War. The superbly trained (i.e., "conditioned") British forces were without air or artillery superiority and consistently outnumbered 3-to-1 while attacking the poorly trained but well-equipped and carefully dug-in Argentine defenders. Superior British firing rates (which were estimated to be well over 90%), resulting from modern training techniques, have been credited as a key factor in the series of British victories in that brief but bloody war. Any future army that attempts to go into battle without similar psychological preparation is likely to meet a fate similar to that of the Argentines. Combat veterans and tactical trainers understand that the human mind and body have predictable responses to surprise and lethal threats.

To give a further historical perspective, the U.S. Army greatly improved its firing rates between World War II and Vietnam using conditioning training. By 1946, it was estimated that the U.S. Army had a firing rate during World War II of 15-20% among American riflemen. The Human Resources Research Office of the U.S. Army subsequently pioneered a revolution in combat training that replaced the old method of firing at bulls-eye targets with that of deeply ingrained "conditioning" using realistic, human-shaped pop-up targets that fall when hit. Psychologists know that this kind of realistic powerful "operational conditioning" is the only technique that reliably influences the primitive, midbrain processing of a frightened human being. Just as fire drills condition terrified school children to respond properly during a fire and repetitious "stimulus-response conditioning" in flight simulators enables frightened pilots to respond reflexively to emergency situations, the introduction of operational conditioning in modern combat training began to yield real results. The application and perfection of these basic conditioning techniques appear to have increased the rate of fire from near 20% in World War II to approximately 55% in Korea and around 95% in Vietnam. Similar high rates of fire resulting from modern conditioning techniques can be seen in FBI data on law enforcement firing rates since the nationwide introduction of these modern conditioning techniques in the late 1960s.

It is a requisite that a soldier train as he will fight. While modern operational urban training involves ballistic shoot house buildings that can be modified structurally (to include a wall, doorway, or staircase,) or by situational placement singularly or collectively, there does not exist a practical means for providing a detailed immersive scenario system that allows for accurate re-creation of situational realism and reconfiguration to handle the multiple training scenarios required for modern operational urban training. Currently, shoot houses and other training structures have only rudimentary details besides physical architecture to immerse the trainee into the scenario. These structures are often blank walled or single tone in appearance with little resemblance in terms of visual detail to what will be found at the actual mission site, or in real life.

Training techniques and tools have evolved to keep pace with these new conflicts and threats. Urban operations training based on more realistic visual details and operational conditioning filter visual details and clues to make situationally-based tactical judgments. Among these are "friend or foe" targets and 360 degree simunition and live-fire shoot houses made of ballistic walls. These shoot houses with pop up and moving type targets have been made portable, reconfigurable, and collectively situated for multi-building or simulated city street training. In this field, entry, spotting and time-to-fire decisions are made in seconds. Thus, the judgments are intended to be based on visual details the trainee is deliberately looking for.

For these reasons, shoot houses and facilities are not as effective as they could be for preparing the trainee for filtering the plethora of visual details to make tactical judgments because not enough of the realistic visual details are included. Part of the reason for this is that houses, rooms and sites often must be used to train for multiple potential or real scenarios that occur, many times by multiple units with different needs or goals.

SUMMARY

It is an object of the presently disclosed subject matter to provide immersive training scenario systems and related methods.

Immersive training scenario systems and related methods are provided. The immersive training scenario systems provide at least one simulated structure. The at least one simulated structure can include a base structure having at least one surface thereon. One or more substrates with one or more photographic images printed thereon are applied to the surface of the base structure so that the simulated structure has realistic visual characteristics representative of a mission site or mission scenario.

The immersive training scenario systems can allow photo-realistic details and site-specific images of the intended operational environment to be applied to interiors and/or exteriors surfaces of a base structure to create a simulated structure. This facilitates the capability to rapidly reconfigure, or customize efficiently for different scenarios, crisis situations and pre-deployment mission rehearsals resulting in more realistic and improved training.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

The patent or application file contains at least one drawing executed in color. Copies of this patent or application with color drawing(s) will be provided by the Patent and Trademark Office upon request and payment of the necessary fee.

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1:
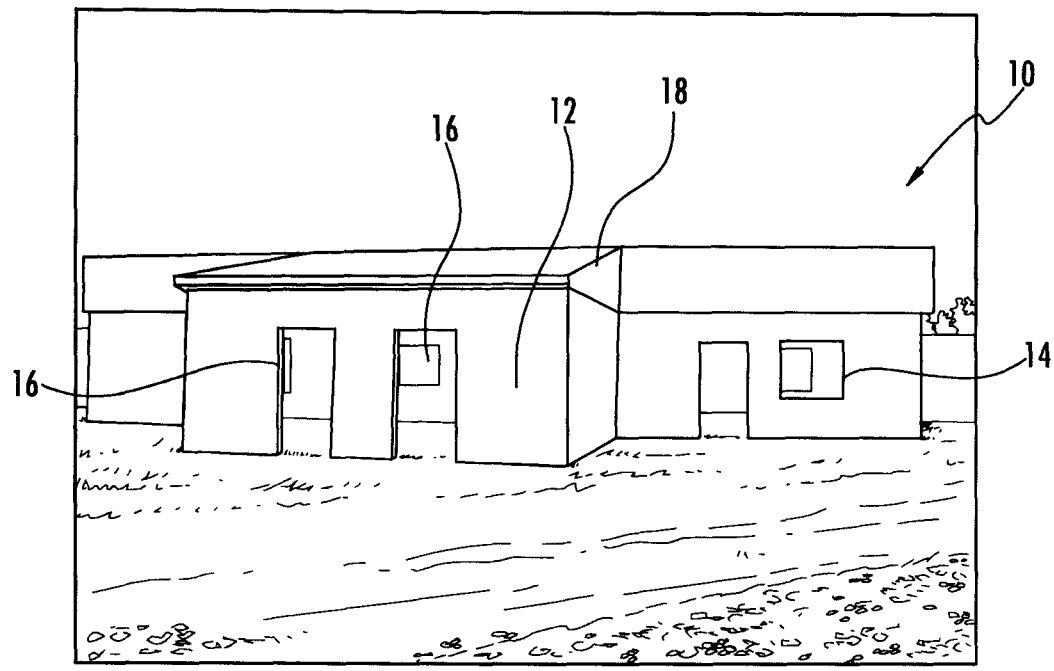
FIGS. 1 and 2 illustrate perspective views of an embodiment of a simulated structure for an immersive training scenario system according to the present subject matter.

Reference will now be made in detail to the description of the present subject matter, one or more examples of which are shown in the Figures. Each example is provided to explain the subject matter and not as a limitation. In fact, features illustrated or described as part of one embodiment can be used in another embodiment to yield still a further embodiment. It is intended that the present subject matter cover such modifications and variations.

"Simulated structure" as used herein means a structure such as a shoot house, a modern operational urban training house, a MATCH house, an urban operation or close quarters combat training facility, that accurately re-creates situational realism with realistic visual characteristics by utilizing site-specific photographic images and large-format printing and the application of same.

"Site-specific" as used herein means a specific location or article such as a specific building, facility or other structure or physical item, or the architectural or structural characteristics of buildings, facilities or other structures or physical items which would be found in the intended operating environment of a mission site or a mission scenario.

"Image-editing program" as used herein means a computer program used to edit or change an image. Examples include Adobe PHOTOSHOP®, PAINT.NET® and PICASA®.

"Image" as used herein means the optical counterpart of an object or environment produced by graphical drawing by a person, a device (such as a computer) or a combination thereof. The optical counterpart of the object can also be produced by an optical device, electromechanical device, or electronic device. As used herein, "image" can be used to refer to a whole image, for example, a photographic image as taken by a photographic device, or a portion thereof.

"First responder" as used herein means persons or organizations that can be the first medically-trained responders to arrive on scene of an emergency, accident, natural or human-made disaster, or similar event. Examples of such responders can include, but are not limited to, police or other law enforcement, firefighters, emergency medical services, or the like.

"Mission" as used herein means any long term or short term plan for military, law enforcement, or other first responder personnel that defines goals and objectives to be reached by the personnel during a definite or indefinite time period. The term "mission" as used herein can also include training for common events that military, law enforcement, or other first responder personnel may encounter during the course of their duties.

"Mission site" as used herein means the location or region where a mission is to be carried out.

"Mission scenario" as used herein means the circumstances surrounding a mission that is to be carried out or training for common events that military, law enforcement, or other first responder personnel may encounter during the course of their duties.

Photo-realistic immersive firearms or tactics training scenario systems allow for photo-realistic details and site-specific images of the intended operational environment to be applied to interiors and/or exteriors of shoot house or other structures. This facilitates the capability to rapidly reconfigure, or customize efficiently for different scenarios, crisis situations and pre-deployment mission rehearsals resulting in more realistic and improved training.

Through concepts like vanishing point perspective, a situational realism can be accurately re-created by utilizing site-specific photographic images and large-format printing and the application of the same on interiors and/or exteriors of shoot house or other structures to provide great detail and ease of use.

FIG. 1 illustrates a structure, which in the illustrated embodiment is a typical permanent shoot house generally designated 10, that can be used in modern operational urban training to facilitate operational conditioning for a combatant. Such a shoot house can be made of modular units as will be described below. The shoot house 10 serves as a base structure and can include ballistic walls 12 in arrangements to resemble a house or other building. Such a shoot house enables military and law enforcement personnel to train in situations in which they face realistic threats to their safety. The shoot house 10 can include windows 14 and doors 16 to further add a more realistic feel.

The ballistic walls 12 of the shoot house 10 can be constructed out of concrete, gravel filled walls, or tire walls. The walls can also be constructed with plates of steel attached together in a ballistically sound manner by facing and backing strips and then covered by a frame. Such a frame typically has two-by-fours attached to the facing strips that hold the plates together, and pieces of plywood that extend between the two-by-fours. A more detailed description of one preferred construction of such ballistic walls is set forth in U.S. Pat. No. 5,822,936; the disclosure of which is incorporated by reference herein in its entirety. Further, a roof 18 can be added to the shoot house 10. While these shoot houses provided a marked improvement over traditional training at a target range, they still do not feel as realistic as conventional looking walls.

One or more substrates can be attached to the shoot house 10 to create a more visually realistic looking simulated structure. The one or more substrates can have at least one site-specific photographic image printed thereon that give the shoot house 10 a very realistic look that can reflect the environment for which the training is being conducted. For example, the substrates, when applied to the shoot house 10, can reflect the building tendencies for a specific area of the world in which personnel that are being trained are to be deployed. Further, if a specific building is targeted, one or more photographic images can be obtained of the building. The photographic images can be manipulated using a computer and an image-editing program and printed on one or more substrates. The substrates can then be applied to a surface of a structure, such as the walls of a shoot house, having similar or proportional dimensions to that of the specific building to re-create a situational realism that is unobtainable short of reconstruction of the specific building.

Figure 2:
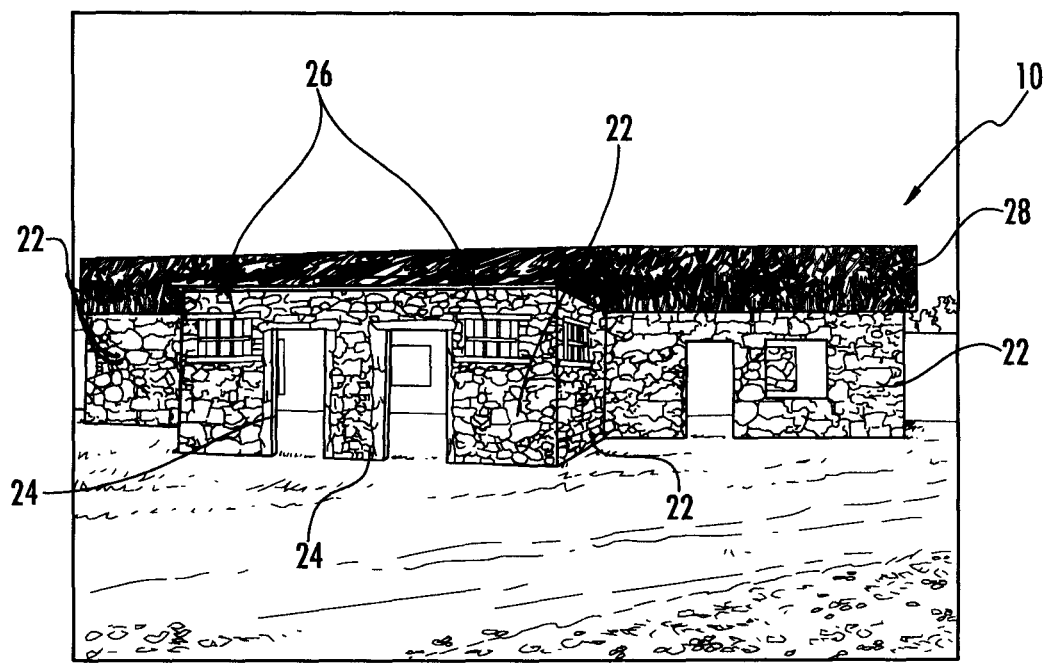

As shown in FIG. 2, the shoot house 10 has multiple substrates 22 applied thereto along surfaces, such as the walls 12 of the shoot house 10. The substrates 22 have one or more photographic images of a rock wall printed thereon to reflect a Middle Eastern construction style commonly found, for example, in Iraq. The substrates 22 can be cut to size to fit the walls 12, leaving space for windows 14 and doors 16. Other substrates 24 can be applied over portions of the substrates 22 to create door jams that also reflect the selected construction style to add further visual architectural integrity to the shoot house 10. For example, the substrates 24 can have a rough hewn wooden door jam printed thereon that can be cut to size and placed around a doorway. Further, another set of substrates 26 can be applied over the rock wall substrates 22 to create false windows on the shoot house 10. The substrates 26 can have a photographic image of a rustic window printed thereon that is architecturally appropriate for the selected construction style. After printing, the substrates 26 with the window printed thereon can be cut to the appropriate size and then applied over the rock wall substrates 22 at appropriate places. One or more substrates 28 can also be applied to the roof line 20. The substrates 28 can have a photographic image printed thereon that comprises one or more images of a roof line that is architecturally appropriate for the selected construction style. For example, the photographic image printed on the substrates 28 can be a thatched roof that might be seen on a rock walled building in the Middle East. As shown in FIGS. 1 and 2, a shoot house can be constructed that provides a realistic visual feel in a quick, effective and inexpensive manner.

The substrates described above can be a thermoplastic film. For example, the substrates can be a vinyl film such as a polyvinyl chloride film. The type of material and characteristics of the substrates used can depend on the end use of the substrates and the type of structure to which it is applied and the operating environment in which it will be used.

Suitable substrates can have a protective overcoating laminated thereto that can provide excellent durability and permit quick modification and/or changeability to change the appearance of the structure to which the substrate is attached. The durability allows the substrates to continue to function in creating visual and situational realism for an extended period of time and under sever weather conditions. The ability to quickly change or modify the appearance of a structure by removal and/or application of the substrates is beneficial for modern operational urban training. It permits the same structures to be used to create visually realistic urban settings from different areas or regions of the world in a quick and simple manner.

An example of a thermoplastic film that can be used is a polyvinyl chloride ("PVC") film. The film can be run through a printer to print the portion of the photographic image on the PVC film. For such a film, the conditions in the printing area are preferably controlled. For example, the room temperature and relative humidity can be between about 60° F. to about 90° F. and the relative humidity can be between about 50% to about 90% RH. For instance, the temperature and relative humidity can be about 73° F. (23° C.) and 50% RH when using as a substrate a 2.7 mil gloss white, polymeric stabilized, soft calendared PVC film designed for receiving digital ink jet printing. The ink used can be printing inks such as digital printing inks. Different inks can be used to ascertain different properties in the final product. The substrate used can be coated on one side with a permanent, opaque, acrylic, pressure sensitive adhesive with air egress technology and supplied with a 80# poly coated liner that is used as a release liner to protect the adhesive until time for application. Below is a list of physical properties of an example acrylic adhesive that can be applied to a substrate such as the PVC film described above.

TABLE 1

Properties of an Example Pressure Adhesive

| Physical Properties | Typical Values | Test Method (Federal Test Methods used) |
|---|---|---|
| Peel Adhesion, lb./in. (N/25 mm) 180 degrees on glass - 24 hr | about 3.2-about 4.6 (about 14-20) | FTM - 1 |
| Quick Tack on Glass lb./in. (N/25 mm) | about 3.4-about 4.8 (about 15-about 21) | FTM - 9 |
| Dimensional Stability, (%) 10" by 10" sample bonded to Aluminum | Maximum of about 0.5 | FTM - 14 |

TABLE 1-continued

Properties of an Example Pressure Adhesive

| Physical Properties | Typical Values | Test Method (Federal Test Methods used) |
|---|---|---|
| Normal Application Temperature and Temperature Ranges for Minimum Application | Above about 50° F. (about +10° C.) About −40° F. to about 194° F. (about −40° C. to about 90° C.) | |

Once the material is printed, it is laid on a drying table and left to "gas" or "dry" for a period of about 72 hours to ensure that the ink is dry. Once the material has gone through the 72-hour period and depending on the end use of the substrate and the structure to which it is to be applied, it can then be laminated in a lamination process to provide an overcoating. Laminating a substrate like PVC film can add strength and protection to the printed image. For example, a laminate when bonded with the PVC film can provide protection to the image by minimizing the ability to scratch or remove the image from the substrate. The laminated substrate can also provide protection to a structure on which it is applied. The laminate can also be used to add gloss or a reflection control layer.

The material used in such a lamination process can be a highly conformable cast film, such as a PVC film, that can range in thickness from about 0.5 mm to about 10 mm. For example, highly conformable cast film having a thickness of about 1.5 mm can be used. A cast vinyl laminate can have a built-in ultraviolet protection, be optically clear, and have a low gloss or no-gloss (flat) finish or matte. The laminate can include a permanent adhesive, such as an acrylic adhesive.

The printed substrate and the laminate can be run through a lamination process where the adhesive side of the laminate faces the printed side of the substrate. The laminate and substrate can then pass through pressurized heated or unheated rollers to secure the laminate to the substrate. The laminate can be usable in temperatures from about 50° F. to about 225° F. Thus, the laminate can be applied to the substrate in hot and cold applications. In the PVC film example, the substrate can be left to cool after the material is laminated at about 120° F.

In another example, a 1.5-mil clear matte or a 1.5-mil clear gloss, which are highly conformable cast PVC films, can be chosen as the laminate. The over-laminate film is coated on one side with a clear permanent, acrylic pressure sensitive adhesive and supplied with a 1.2 mil polyester release liner. Upon application, the release liner can be removed. The printed substrate and the laminate can be aligned so that the adhesive side of the laminate faces the printed side of the substrate. The laminate and substrate can then pass through pressurized rollers to secure the laminate to the substrate. UV protection can be incorporated into the over-laminating film to help extend the life of the graphic by resisting color fade caused by ultraviolet light.

Once the substrate has been created with the image printed thereon, the substrate can be applied to a surface on the base structure to be covered. A substrate, such as the PVC film described above with its adhesive backing, can be attached to wood, brick, plaster, drywall, stone, steel, rubber, cardboard, particle board, chloroplast or the like where the temperature range and adhesion characteristics are favorable.

Figure 3:
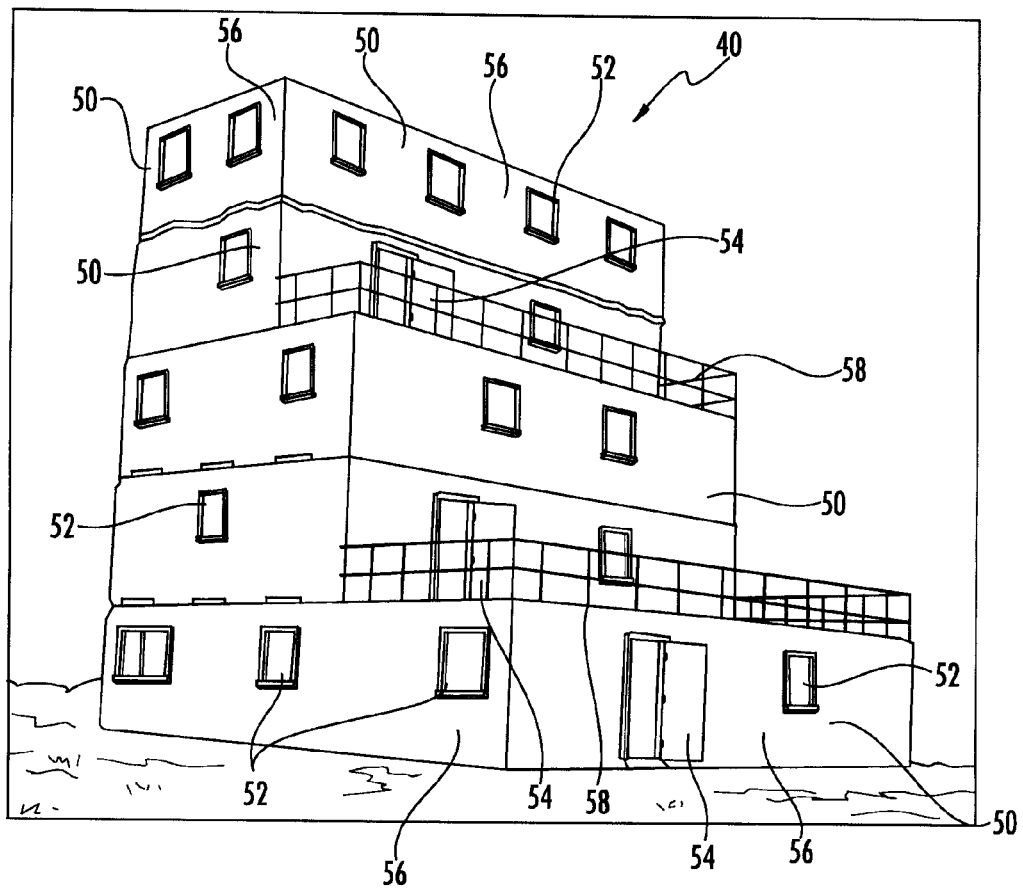
FIGS. 3 and 4 illustrate perspective views of another embodiment of a simulated structure for an immersive training scenario system according to the present subject matter.
Figure 4:
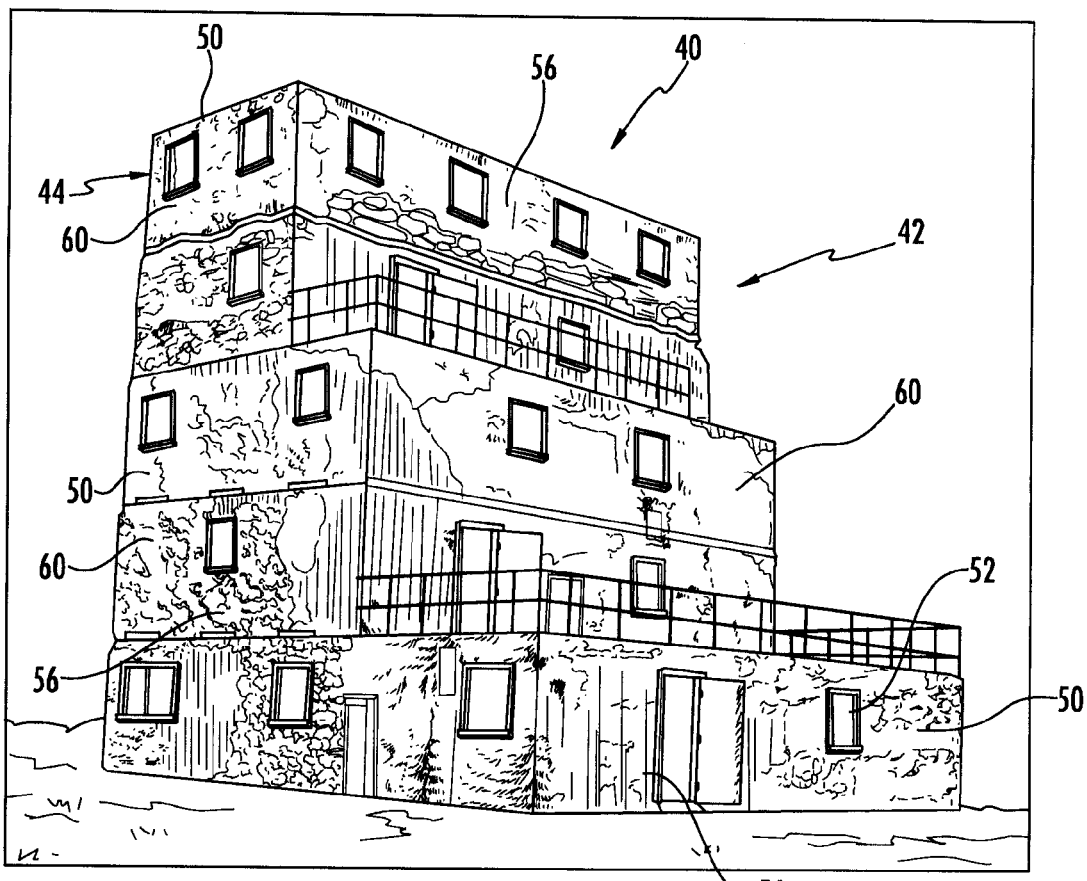
Figure 5:
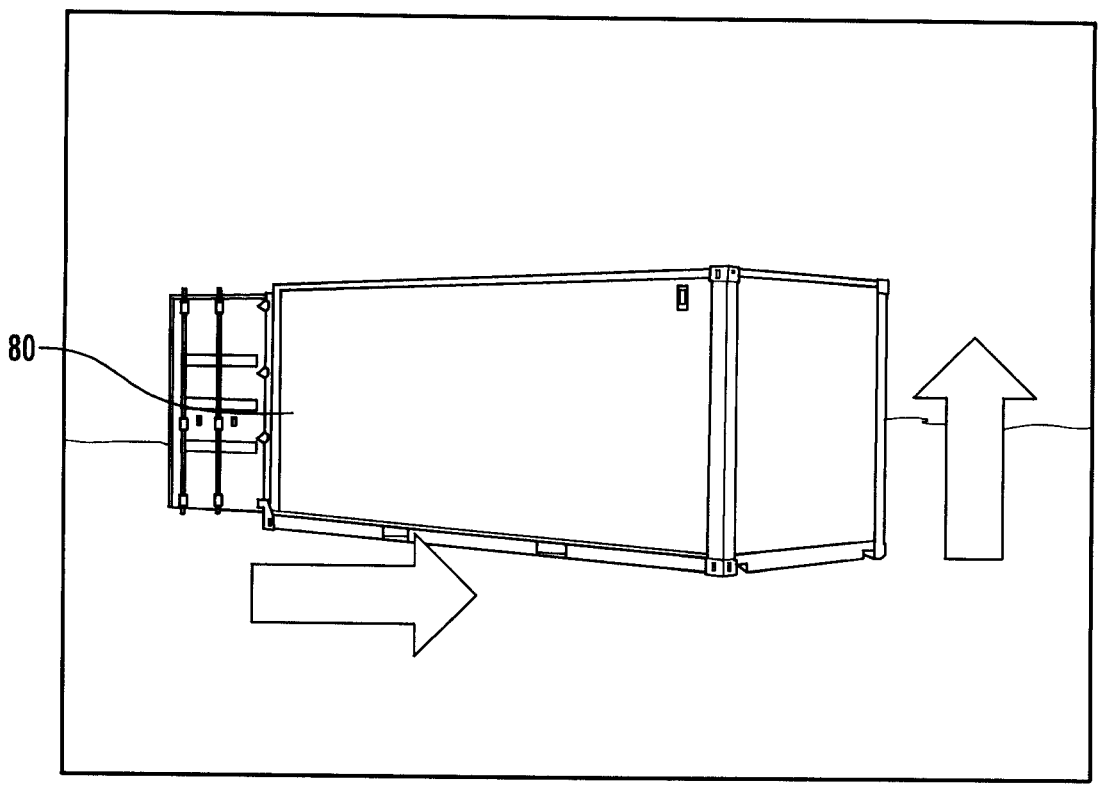
FIGS. 5-12 illustrate possible steps for creating embodiments of a simulated structure for an immersive training scenario system according to the present subject matter.

FIGS. 3 and 4 illustrate another embodiment of a structure that can be turned into a simulated structure that can be useful for modern operational urban training. The structure 40 shown in FIG. 3 is created in a different manner than the shoot house 10 shown in FIG. 1. Structure 40, which in this embodiment can also be termed a shoot house or a tactical training facility, is constructed of a plurality of modular units 50. The modular units can be any prefabricated structures that are generally interchangeable and can be used with other modular units to assemble a larger structure that is representative of an intended target. For example, the modular units 50 can be modified cargo hulls or specially created modular structures. For instance, each modular units 50 can include interior and exterior panels that consist of standard dimension panels mounted on a grid system, and can include solid panels (single and double sided), window panels, and door panels, with or without breach capabilities. The interior of each modular unit 50 can include bullet containment walls configured to allow live-fire within the modular units 50. More specifically, the walls in each modular units 50 can include armored panels and/or armored steel plates to maintain the integrity of the walls when rounds of bullets are shot in the modular units 50. Alternatively, the modular units 50 can be configured for simulated munitions, such as paintballs. In this embodiment, lightweight walls can be used in place of the bullet containment walls.

The modular units 50 in FIG. 3 can be configured to construct the tactical training facility 40. Each modular unit 50 is portable, thereby allowing the modular units 50 to be moved and reconfigured into the tactical training facility 40, or a different structure. The modular units 50 can be configured with various features, such as widows 52 and doors 54 in its walls 56. Further, the interior of each modular unit 50 can be configured with other various features such as stairwells, walls, doors, and hallways.

The layout and configuration of the modular units 50, individually and as a group, can be determined based on the type of training to be carried out in the units. For example, the structure 40 may be used as a generic training facility for military, law enforcement, or other first responder personnel for scenarios that might be common in the operational environment in which the personnel will perform their duties. In such a case, the training facility does not have to replicate a specific structure, but can be a structure that has elements commonly found in the operational environment. In another example, the structure 40 can be constructed to replicate a specific building. In such case, the structure will contain a specific layout with specific features that replicate the intended target structure.

To determine the layout, intelligence can be gathered as to details of the mission site and mission scenario. If the structure is for generic training, general details about the location or region of the intended operational environment can be collected and used to create a structure with elements common to the structures of the region. If the structure is for specific training, then specific details about the structure to be replicated are gathered. The intelligence gathered for either type of training scenarios can includes photographs, blue prints, witness accounts, simple and advanced surveillance, or the like. Mission/training dimensions calculated as to dimensional plans like floor-wall and door plans can be used to derive a planned layout that is used to assemble the modular units 50 in a manner that reflects the intended operational environment. The modular units which can be constructed to a predetermined standard design or structural foot pattern can then be modified to create the intended structure.

For instance, each modular unit 50 can include a standard width and a standard length. The standard design allows each modular unit 50 to be arranged in a side by side configuration or in a stacked configuration without substantially modifying the modular unit 50. Additionally, the standard design allows the modular units 50 to be prefabricated prior to assembly of the intended structure, thereby reducing the design and construction efforts. Another benefit of a standard design is that the modular unit 50 may be disassembled and reconfigured with minimal effort, thereby adding flexibility in modifying training scenarios once erected. In one embodiment, the modular unit is containerized. For instance, the modular unit is built on ISO 9000 container concepts, with foldable frames for flat-pack shipping. In addition, other features, such as balcony guardrails 58 or exterior stairways may be added to the structure 40 to create a more realistic tactical training facility.

Once the structure 40, which serve as a base structure, is reconfigured or built in the desired manner, substrates having photographic images printed thereon can be applied to the surfaces of the structure 40 on its exterior and interior to create a more visually realistic scenario that reflects a general appearance of structures common to the intended operational environment or reflects the visual characteristics of a specific structure intended to be replicated. As shown in FIG. 4, substrates generally designated 60 with photographic images thereon can be applied to the walls 56 of the modular units 50. Each substrate 60 can have a portion of a photographic image printed thereon. For example, the substrates 60 can be divided into predetermined sized panels on which a specific section of a larger photographic image can be added.

An image, which can come from the intelligence gathered for the mission site or mission scenario, can be edited on a computer for proper details, scale, and perspective for each of the intended applications. The image can be a conglomeration of other images that can be combined together using an image-editing program. The images may include persons or objects known or anticipated to be in the field of view that aid in accurately re-creating situational realism. The image, once properly sized and scaled to fit the structure can be divided into panels. These panels can be printed onto an appropriately sized substrate similar to those described above.

The panels of the substrates 60 can then be applied to the walls 56 of the modular units 50 to create an architecturally appropriate visual appearance on the structure 40. Different images for the different sides of the structure 40 can be used. For example, for a specific building, a photographic image of the front side of the specific building taken at an appropriate angle to create the correct perspective can be used for creating the paneled substrates on a front side 42 of the structure 40. For side 44 of the structure 40, a photographic image of the side of the specific building relative to its front side taken at an appropriate angle to create the correct perspective can be used for creating the paneled substrates used on the appropriate side 44 of the structure 40 relative to its front side 42. Further, images used on each side can be a conglomeration of images fused together using an image-editing program to give a realistic visual appearance to the structure 40 when the generated image is printed on the substrate panels.

The process for creating the immersive training structure is illustrated in FIGS. 5-12. A structure 80 is constructed or obtained that is to be used to create a simulated structure for use in modern operational urban training. One or more photographic images 82 (see FIG. 6) are obtained that can be used to add appropriate visual architectural characteristics to the structure 80. Suitable high megapixel images can be used if available and/or the intelligence derived in planning the mission site and/or the mission scenario can dictate the photographic images to be used.

Figure 6:
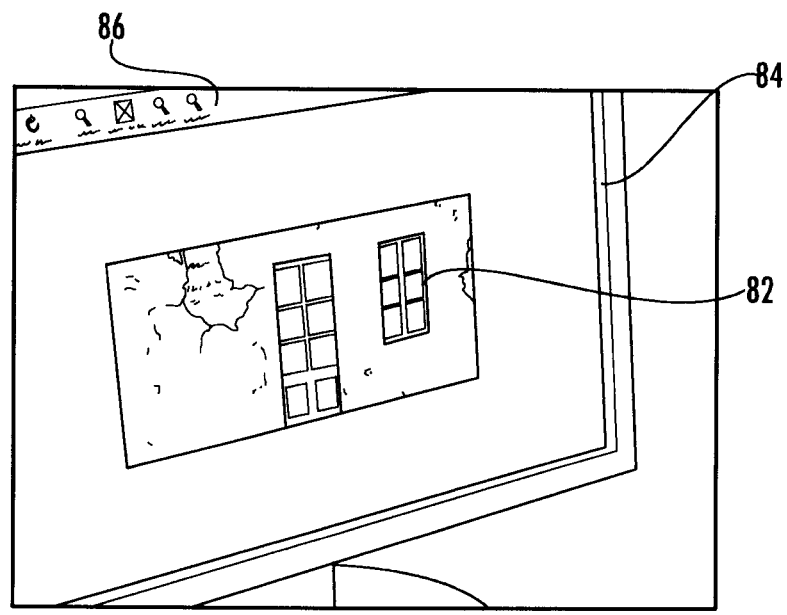

The photographic image 82, which can be digital, is opened on the computer 84 in an image-editing program 86 as shown in FIG. 6 so that the digital photographic image 82 can be enhanced and manipulated to create an image that can be printed on panels of substrate used to cover the structure 80 to create appropriate visual architectural characteristics on the structure 80. The image-editing program can be, for example, PHOTOSHOP® offered by Adobe Systems Incorporated, San Jose Calif. Other image-editing programs can include equivalent photo manipulation and editing software programs such as PAINT.NET® and PICASA®, or the like, or in the case of video footage the image-editing programs can include appropriate video editing software programs that will produce a digital still frame photographic image. Through concepts like vanishing point perspective, a situational realism can be accurately re-created by editing, enhancing, and manipulating the one or more images 82 as needed to reflect appropriate and realistic visual characteristics once printed on a substrate and applied to the structure 80.

Once the desired image is confirmed, a proof can be printed to check and see if the appropriate color, clarity, and depth are still being achieved and the image is still an ideal match for the operating environment and the structure 80.

Next, using the image-editing program, the image can be divided into the sections called panels hereinabove. After printing, these panels can fit together overlapping one another when placed on the structure. No registry lines are necessary. The overlapping of the panels improves seal, adhesion, and installation procedures. The sizes of the panels can depend on the size of the structure to be covered and are only constrained by the cost effectiveness of the selected size, manageability of the installation process, and the printer capabilities. For example, the panels can range from a few square inches to lengths and widths of 100 inches or more.

Once the design is divided into corresponding panels using the image-editing program, the image panels can be printed to a substrate. If the three items of color, clarity, and depth are achieved, then the panel sections are saved and sent to a printer 90 (see FIG. 7) to begin the "rip" process of transferring the panel images to the printer and the printer's software. Before the rip process is to begin, another proof can be printed to make sure that nothing has moved or been dropped from the file. Once this proof is checked, a test print process of printing an actual panel or a portion of an actual panel on a substrate can be done to make sure the colors match between the image on the screen of the computer and the image printed on the substrate.

Figure 7:
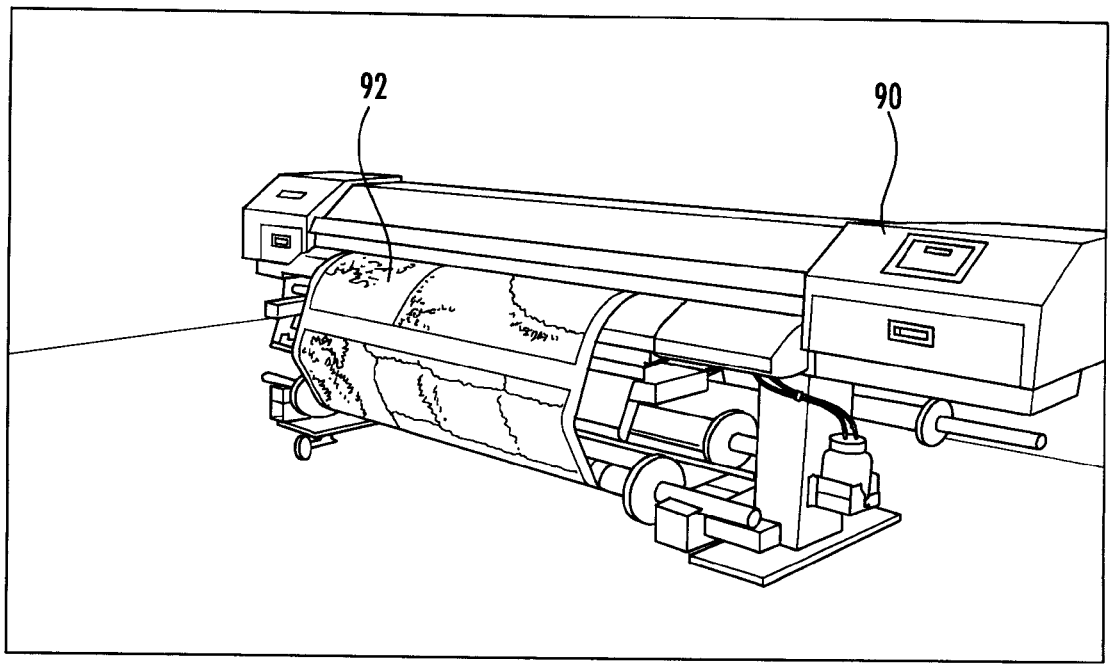

If there is a match, the printer 90 as shown in FIG. 7 is used to print the necessary panels 92 of substrate as described in detail above. The panels 92 of substrate can be, for example, a large format graphics medium such as adhesive vinyl graphic film. The printer 92 can be large format printing technology such as inkjet printers.

Different sized panels can be used. The number and size of the panels may vary based on the criteria outlined above. In particular, the sizes of the panels can depend on the size and shape of the structure to be covered and are only constrained by the cost effectiveness of the selected size, manageability of the installation process, and the printer capabilities. The selected sizes can assist with the installation process. The selected sizes can help with manageability and control of the product for the installation crews during the installation process. The selected sizes can promote versatility as some of the installations are done outdoors and some are done indoors. Wind and the elements are also a factor in the installation process.

After the photographic image is printed on the substrate panels, the substrate panels can be laminated as described above to protect the printed image and to add other desirable characteristics to the panels. For example, a protective clear matte over-laminate can be applied for protection from elements and to protect the underlying printed image. At this stage the structure 80 can be prepped for application of the panels 92 of the substrate with the images thereon. This preparation can include the cleaning of the structure 80 to remove any debris that may interfere with the attachment of the panels 92 to the structure 80. A substrate, such as the PVC film described above with its adhesive backing, can be attached to a structure 80 made of most common construction materials where the temperature range and adhesion characteristics are favorable. For example, the structure 80 can comprise wood, brick, plaster, drywall, stone, rubber, cardboard, particle board, chloroplast or the like. The structure 80 can also comprise metals, such as steel, iron, aluminum, aluminum alloys, or the like.

Figure 8:
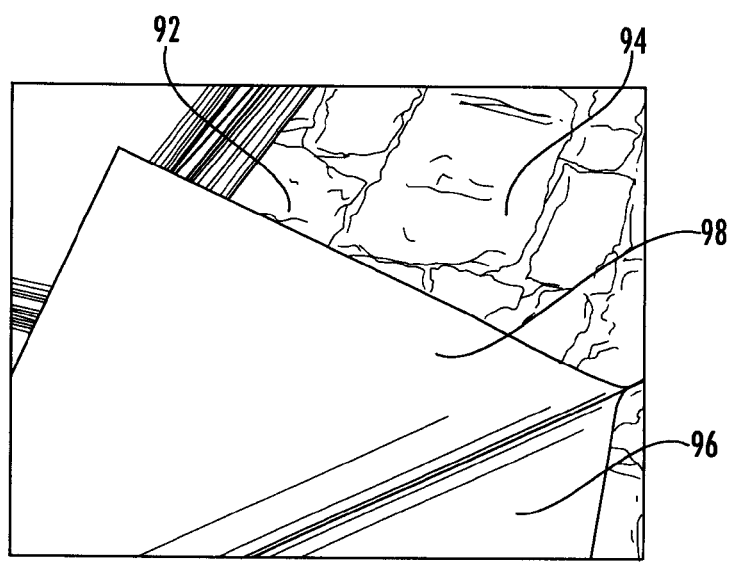
Figure 9:
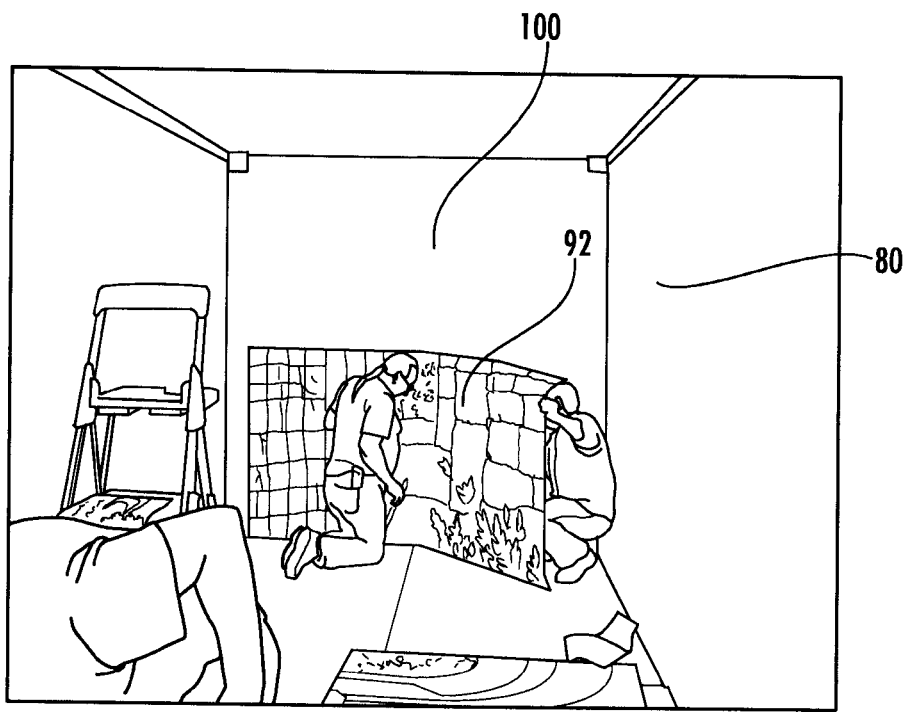

An installation process can be used to facilitate proper attachment of the panels 92 to the structure 80. As shown in FIG. 8, each substrate panel 92 with the printed image 94 thereon can have a release liner 96 that protects the side 98 of the panel 92 on which the adhesive resides. The release liners 98 can be separated from the panels 92 to expose the sides 98 and the adhesive thereon. As shown in FIG. 9, once the panel 92 is properly sized for the position on the respective wall 100 on which it will be placed, the release liner 98 (see FIG. 8) can be removed and the panel 92 can be applied to the wall 100 with the adhesive side of the panel 92 being pressed against the wall 100. Depending on the substrate and/or adhesive used, the panels 92 can be applied using heat and/or pressure to adhere it to the wall 100 of the structure 80. As shown in FIG. 9, the panels can be applied to interior walls 100, and, as shown in FIG. 12, the panels can be applied to exterior walls to create a structure that provides an immersive environment for training.

Figure 10:
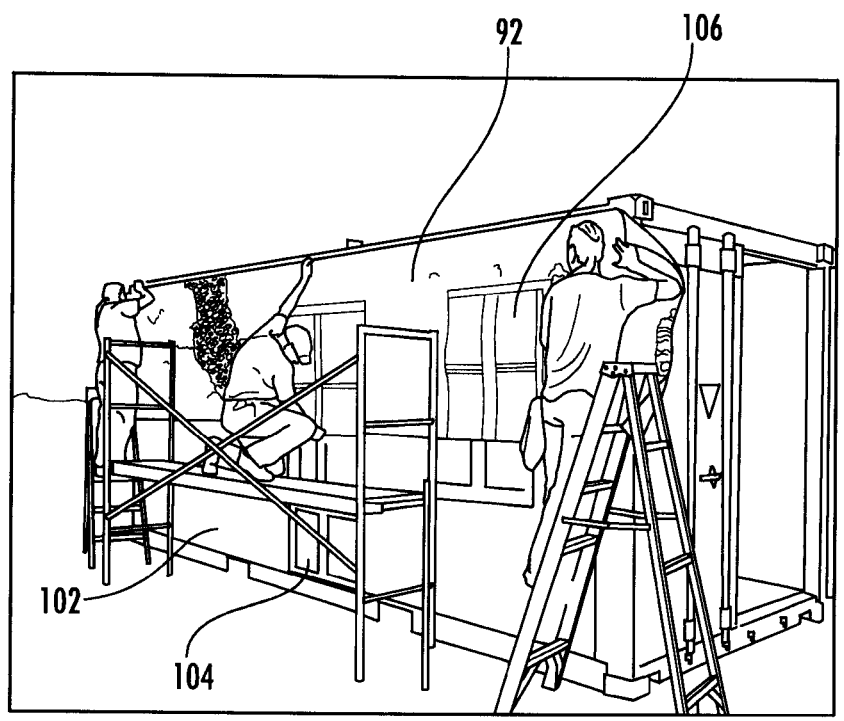

As shown in FIG. 10, depending on the structure of a wall 102, the panels 92 can be properly sized before removal of the release liner. For example, the panel 92 can be laid over the wall 102 and then cut to size to fit around doorways 104 or windows 106 that reside in wall 102 of structure 80. After cutting the panel 92 to size, the release liner can be removed and the panel 92 applied to the wall 102.

Figure 11A:
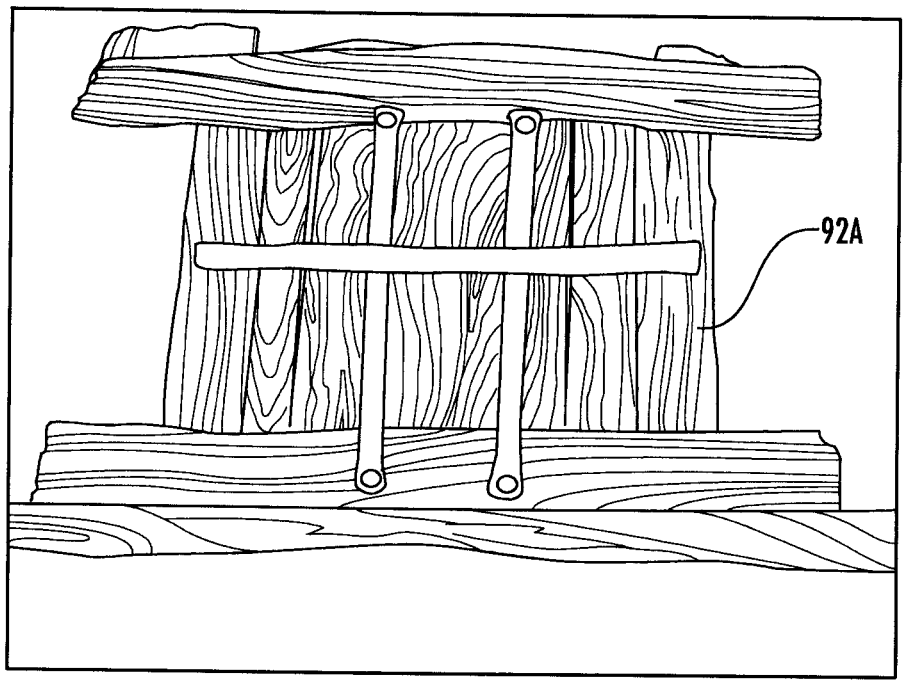
Figure 11B:
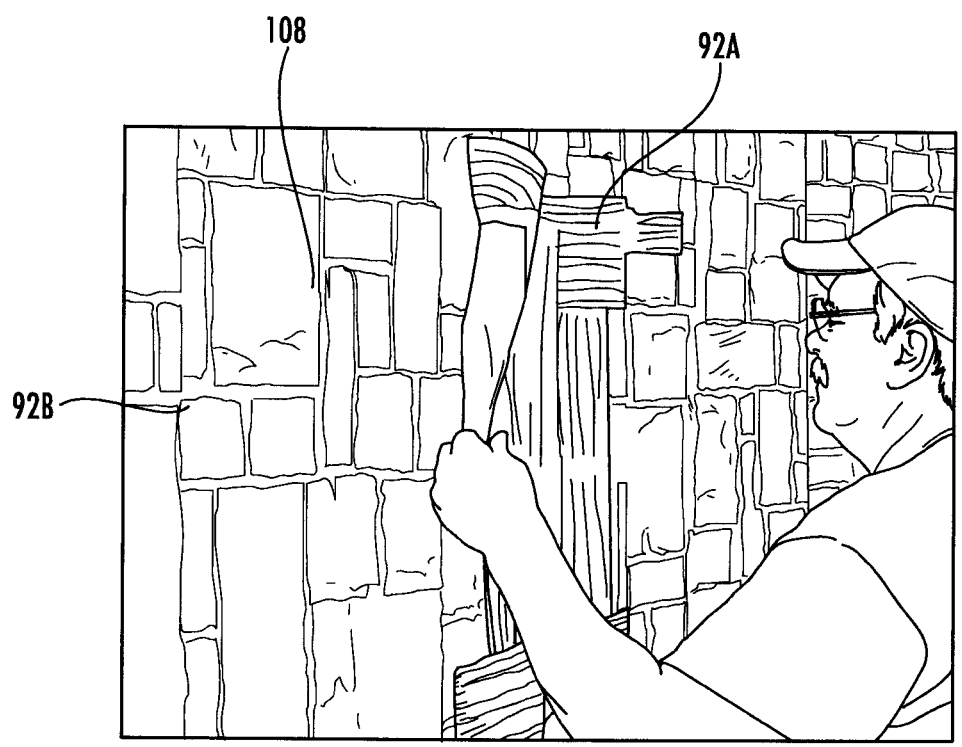

Panels of substrate with images printed thereon can be overlaid for rapid change, re-configuration, enhancement, or repair. This overlaying can be accomplished by simply overlaying another panel of substrate on top of a first panel of substrate. For example, a panel 92A of substrate can have an image of a window printed thereon as shown in FIG. 11A. After a first panel 92B that has an image of a stone wall is attached to a wall 108 of structure 80 and the panel 92A is sized, the panel 92A with the image of the window printed thereon is applied over top the panel 92B of the stone wall as shown in FIG. 11B.

Figure 12:
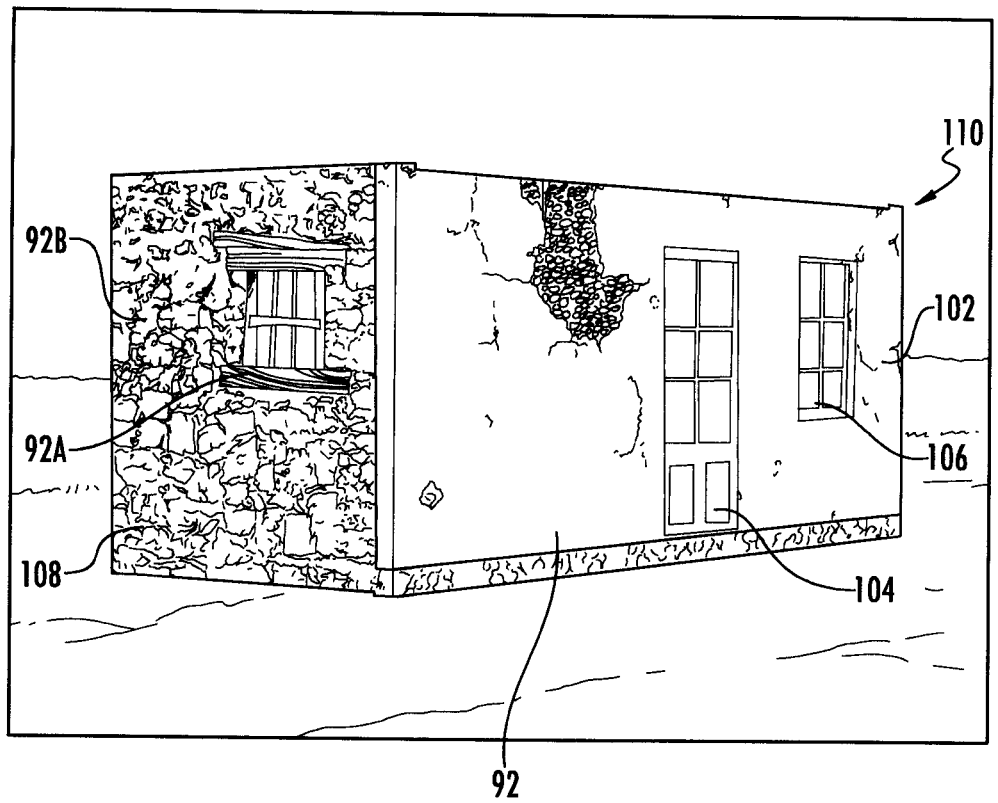

After applying all the panels 92 of substrate with the images printed thereon, structure 80 becomes a simulated structure 110 as shown in FIG. 12 that possesses realistic visual characteristics to create an environment more conducive for immersive training for military, law enforcement, and other first responder personnel. As shown in FIG. 12, simulated structure 110 has substrate panels 92 and 92B secured to its walls 102 and 108 respectively with an operational door 104 and window 106 in wall 102. A substrate panel 92A with a false window printed thereon is applied over panel 92B on wall 108.

As necessary, the panels 92 can be removed and replaced. Removal is accomplished by loosening the film with heat and peeling off the film from the structure.

Such structures as simulated structures 10, 40, and 110 can be arranged into a grouping of buildings to provide a comprehensive immersive training environment. These groupings can be arranged to simulate villages or sections of a city for training military, law enforcement or first responder personnel. Such groupings can be used in training mounted (i.e., residing on a vehicle) or dismounted personnel. The number of simulated structures in a grouping can range from 1 simulated structure to over 400 simulated structures. Further, the number of personnel trained in such groupings of simulated structures can range from 1 personnel to over 4,000 personnel. For example, a brigade combat team of the U.S Army can train in such a grouping of simulated structures. In one embodiment, such a grouping of simulated structures can be arranged as a village in central Iraq for the purpose of realistic counter-IED training.

Through the systems and processes described above, situational realism is created by photographic immersion through the use of add-on photographic images printed onto substrates that are applied to structures to create a visually realistic appearance for the structures. This process allows the replication of an operational environment for a realistic training and mission rehearsal environment through site-specific interactive training set design.

To further enhance the training environment, safety training furnishings can be placed in and around the simulated structures. Safety training furnishings can be created by applying substrates with photographic images of the intended physical item printed thereon to three-dimensional structures comprising plastic, aluminum sheeting, plywood, cardboard, or the like to provide a visually realistic replication of the intended item. Such safety training furnishings provide cost-effective furnishings that are visually realistic but are collapsible upon hard contact to provide a safer environment for training. Such safety training furnishings are lightweight, easily sustained in a range environment and safe for the trainees. These furnishings and appliances can be photo-replications of those found at an actual mission site or furnishings and appliances that are typical in the intended operational environment based upon intelligence gathered.

Figure 13:
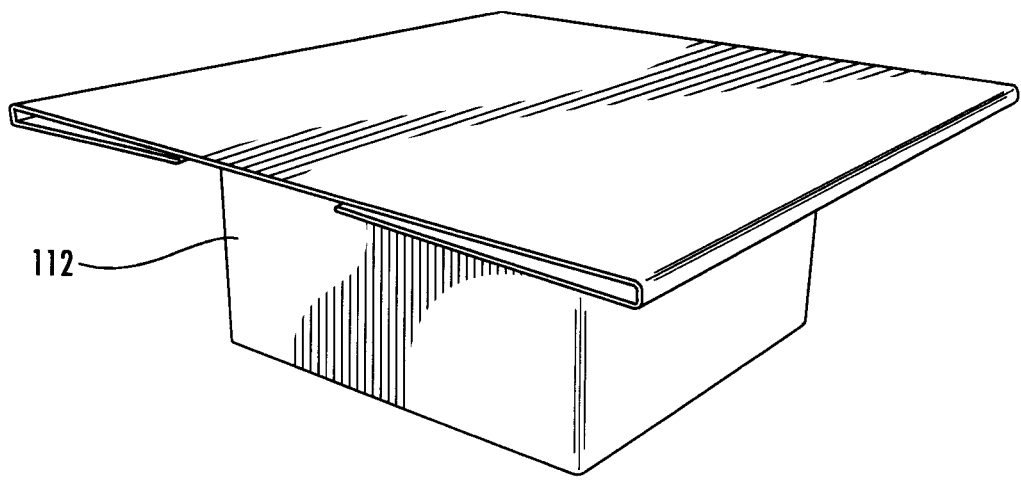
FIG. 13 illustrates a perspective view of an embodiment of a safety training furnishing for an immersive training scenario system according to the present subject matter.
Figure 14:
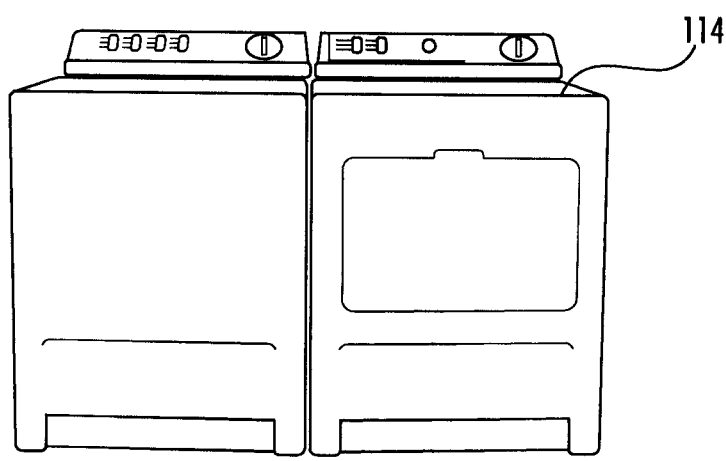
FIG. 14 illustrates a perspective view of another embodiment of a safety training furnishing for an immersive training scenario system according to the present subject matter.
Figure 15:
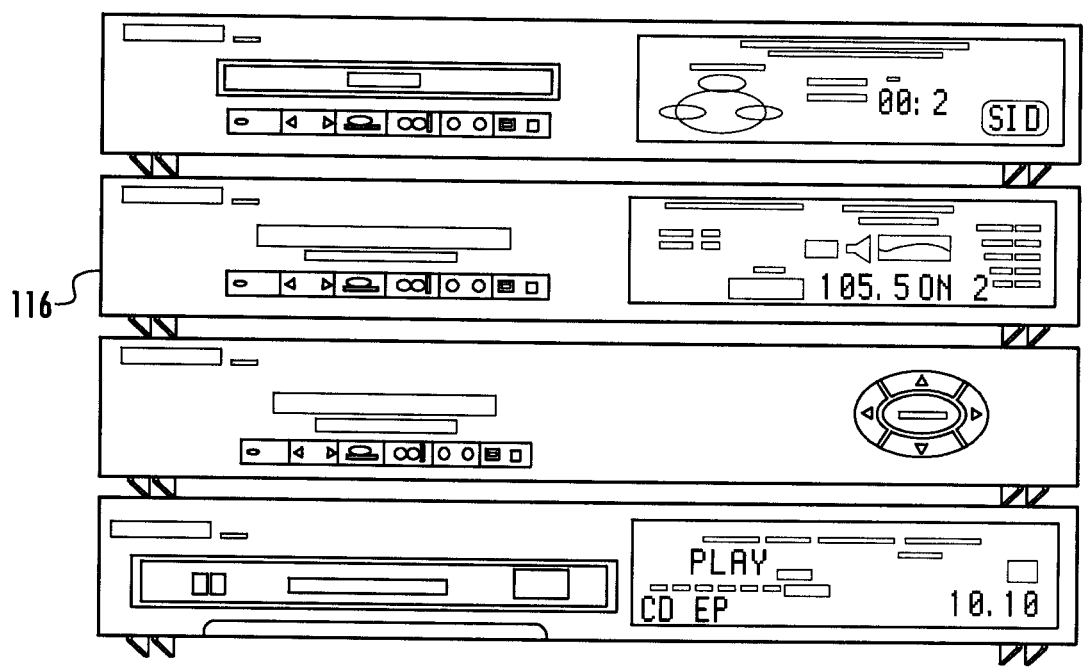
FIG. 15 illustrates a perspective view of a further embodiment of a safety training furnishing for an immersive training scenario system according to the present subject matter.

Examples of safety furnishings within a photo-realistic immersive firearms or tactical training scenario system site include a coffee table 112 as shown in FIG. 13, a washer and dryer 114 as shown in FIG. 14, and a stereo 116 as shown in FIG. 15. As shown in FIG. 13, the coffee table 112 can be constructed of a cardboard blank. The blank is folded to create the shape of the coffee table 112. One or more photographic images of a coffee table can be taken. As described in detail above, the photographic images can be manipulated using an image-editing program and these images can be printed to substrates that are applied to the cardboard coffee table 112. Similarly, the faux washer and dryer combo 114 can be a plastic hollow body with substrates such as PVC films having enhanced photographic images printed thereon adhered/applied to the plastic hollow body to create the visually realistic washer and dryer replication. Similarly, a substrate having enhanced photographic images of a stereo printed thereon can be adhered/applied to modular cardboard boxes to create the visually realistic stereo replication 116. Another example includes taking a construction safety barrel made from plastic and applying substrates such as PVC films having enhanced photographic images printed thereon to create a replication of metal or earthenware barrel or container. The above-described examples illustrate the many possibilities of safety training furnishings that can be created for use in the structures and groupings of structures, such as a training village described above.

Figure 16:
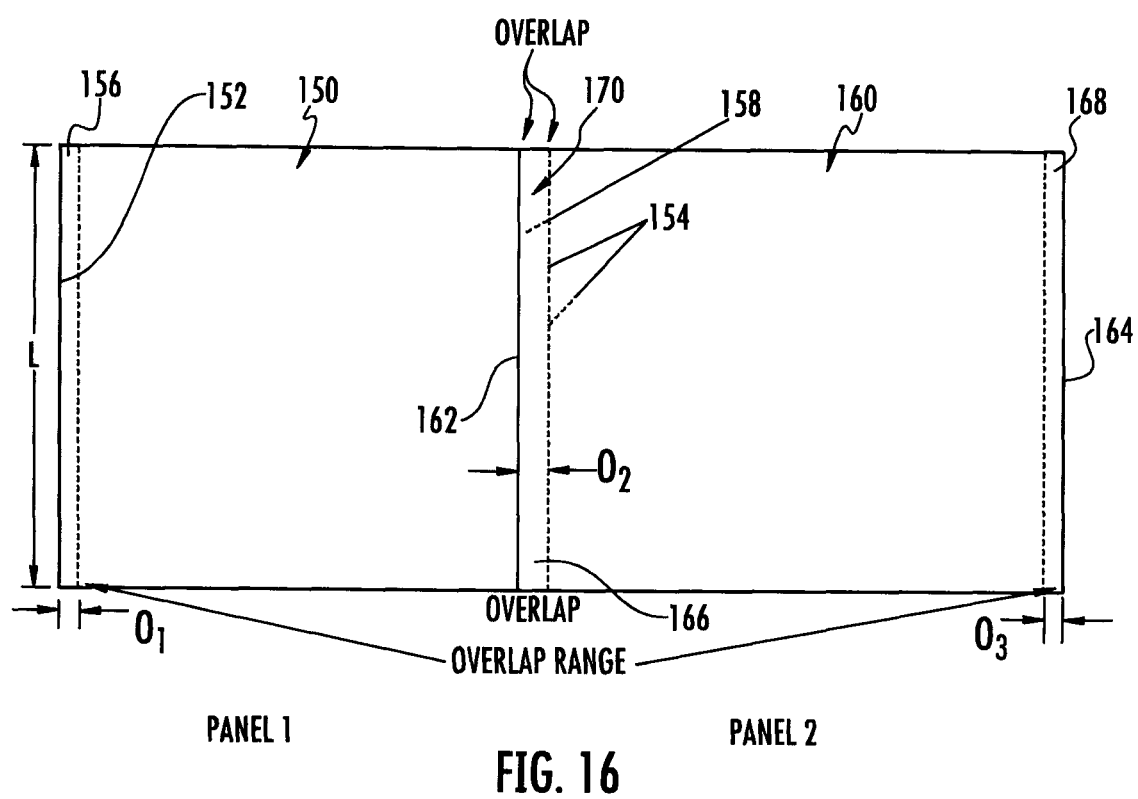
FIG. 16 illustrates an embodiment of panels having an image printed thereon that can be attached to a simulated structure or safety training furnishing according to the present subject matter.

As described above, the panels can be installed on a structure or physical item, so that the panels overlap each other. FIG. 16 illustrates two panels generally designated 150, 160 that can be placed on a physical item such as a structure or a physical item. When placed on the structure or physical item, the two panels 150, 160 can have an overlap generally designated 170. Each panel can have a length L. As shown in FIG. 16, the length L for each panel 150, 160 can be the same; however, in other embodiments the lengths of the panels that are to be placed beside each other can have different lengths.

First panel 150 can have a first side 152 and a second side 154. A portion of each side 152, 154 can be designated as an overlap area 156, 158, respectively. The overlap areas 156 and 158 can run the length L of first panel 150. Overlap area 156 can have a width with a distance $0_1$ and overlap area 158 can have a width with a distance $0_2$. Distance $0_1$ and distance $0_2$ can be the same or different. Similarly, second panel 160 can have a first side 162 and a second side 164. A portion of each side 162, 164 can be designated as an overlap area 166, 168, respectively. The overlap areas 166 and 168 can run the length L of second panel 160. Overlap area 166 can have a width with a distance $0_2$ and overlap area 168 can have a width with a distance $0_3$. Distance $0_2$ and distance $0_3$ can be the same or different. Each overlap area 156, 158, 166, 168 can contain portions of the image printed on the respective panels 150, 160. The images on each panel 150, 160 can be aligned as to form a large continuous image.

First panel 150 can be installed with overlap area 156 overlapping another panel (not shown) or it can be applied directed to the structure or physical item with no overlap. Once installed, the second panel 160 can be installed such that overlap area 166 of the second panel 160 extends over overlap area 158 of the first panel 150 to create overlap 170. This overlap 170 helps to ensure good coverage, for example, of the physical item on which the panels 150, 160 are placed. As described above, the distance $0_2$ of overlap 170 and the distances $0_1$, $0_3$ depend on factors that can include, for example, intended use, environment of use, the type and size of the physical item, and the type of substrate, laminate or ink used. The overlap 170 can range from about 0.75 inches to about 3 feet depending on the application and the factors listed above. Overlap area 168 of second panel 160 can overlap another panel (not shown). Alternatively, overlap area 168 of second panel 160 does not have to overlap another panel.

Through the use of substrates with photographic images printed thereon applied to structures and/or physical items, simulated structures and/or safety training furnishings can be created that have realistic visual characteristics that can be reflective of a mission site or mission scenario. Such simulated structures and safety training furnishings can be used to create an immersive training scenario system to provide better training to military, law enforcement, or first responder personnel.

Embodiments of the present disclosure shown in the drawings and described above are exemplary of numerous embodiments that can be made within the scope of the appending claims. It is contemplated that the configurations of the immersive training scenario systems and related methods for making the same can comprise numerous configurations other than those specifically disclosed. The scope of a patent issuing from this disclosure will be defined by these appending claims.

What is claimed is:

1. A method of creating an immersive training scenario system for training military, law enforcement or other first responder personnel, the method comprising:

selecting one or more photographic images that are at an appropriate angle and are representative of an actual structure expected within at least one of a mission site or a mission scenario for military, law enforcement or other first responder personnel;

enhancing the one or more photographic images to ensure proper details, scale, and perspective for an intended operational environment;

printing the one or more photographic images with a printer on one or more substrates; and applying the one or more substrates to a modular structure and arranging the modular structure to create a simulated structure that has realistic visual characteristics representative of the expected actual structure and the mission site or mission scenario.

2. The method according to claim 1, wherein the photographic images comprise digital images.

3. The method according to claim 2, wherein the digital photographic images comprise high megapixel images.

4. The method according to claim 1, wherein the photographic images comprise images of persons or objects that are anticipated to be in the field of view during the intended mission.

5. The method according to claim 1, wherein the substrate comprises a vinyl film.

6. The method according to claim 1, wherein the vinyl film includes an adhesive on one side.

7. The method according to claim 1, wherein the vinyl film comprises polyvinyl chloride.

8. The method according to claim 1, further comprising applying multiple substrates with images printed thereon to the structure such that at least one of the multiple substrates is applied over top of another of the multiple substrates.

9. The method according to claim 1, further comprising gathering intelligence on at least one of the mission site or the mission scenario, the intelligence including one or more photographic images.

10. The method according to claim 9, wherein the intelligence gathered further includes at least one of witness description, video imaging, audio information or advance surveillance technology.

11. The method according to claim 9, wherein the intelligence gathered for a mission site further includes dimensional floor, wall and door plans of the actual location to be re-created.

12. The method according to claim 11, further comprising designing the structure based on the dimensional floor, wall and door plans of the actual location to be re-created.

13. The method according to claim 12, wherein the one or more photographic images comprise photographic images of the actual location to be re-created.

14. The method according to claim 1, further comprising adding safety training furnishings to the operational environment in and around the simulated structure, 15. The method according to claim 14, wherein the safety training furnishings comprise material that collapses upon forceful contact, the material being covered with a substrate having a photographic image printed thereon to create a realistic visual characteristic of a physical item that the safety training furnishing is trying to replicate.

16. The method according to claim 1, wherein at least one additional simulated structure that has realistic visual characteristics representative of the mission site or mission scenario is created by applying one or more substrates with the one or more photographic images printed thereon to an additional structure.

* * * * *